Sept. 17, 1940.  J. C. GORMAN  2,215,034

SHAFT SEALING MEANS

Filed April 12, 1940

Inventor
JAMES C. GORMAN
By Dowell & Dowell
Attorneys.

Patented Sept. 17, 1940

2,215,034

UNITED STATES PATENT OFFICE 2,215,034

SHAFT SEALING MEANS

James C. Gorman, Mansfield, Ohio

Application April 12, 1940, Serial No. 329,366

5 Claims. (Cl. 286—7)

This invention relates to seals or to improvements in seals for rotary shafts against grease or fluid leakage at their points of extension into closure casings, having reference more especially to rotor or impeller driving shafts of liquid pumps and the like.

An object of the invention is to provide an improved seal or sealing device wherein the sealing elements are locked against rotation or drag turning with the rotating parts, so as to prevent them from being ground out with resultant destruction of the seal after a certain amount of wear or loss of friction which may permit them to slip against their contacting surfaces. It has been found that most shaft seal failures are due to the yield to rotation that follows after a certain time or period of use in which the sealing elements lose their frictional resistance to such movement, due either to aging or to the effects of the grease or fluid which in either event results in a depreciated resiliency.

Another object is to provide an improved sealing means, causing the least possible friction upon the shaft and thereby reducing wear as well as the power necessary to drive the shaft. At the same time, simplicity in construction is a decided aim which along with a greater durability has been kept particularly in mind.

A further object is to provide for a positive and plentiful lubrication assuring full efficiency and reducing the possibility of heating, with resultant binding, to the fullest possible extent.

Other objects and the particular advantages of the invention will be set forth or appear from the following description made with reference to the attached drawing, which illustrates one practicable embodiment of the same in application to the rotor shaft of a centrifugal liquid pump.

Figure 1:
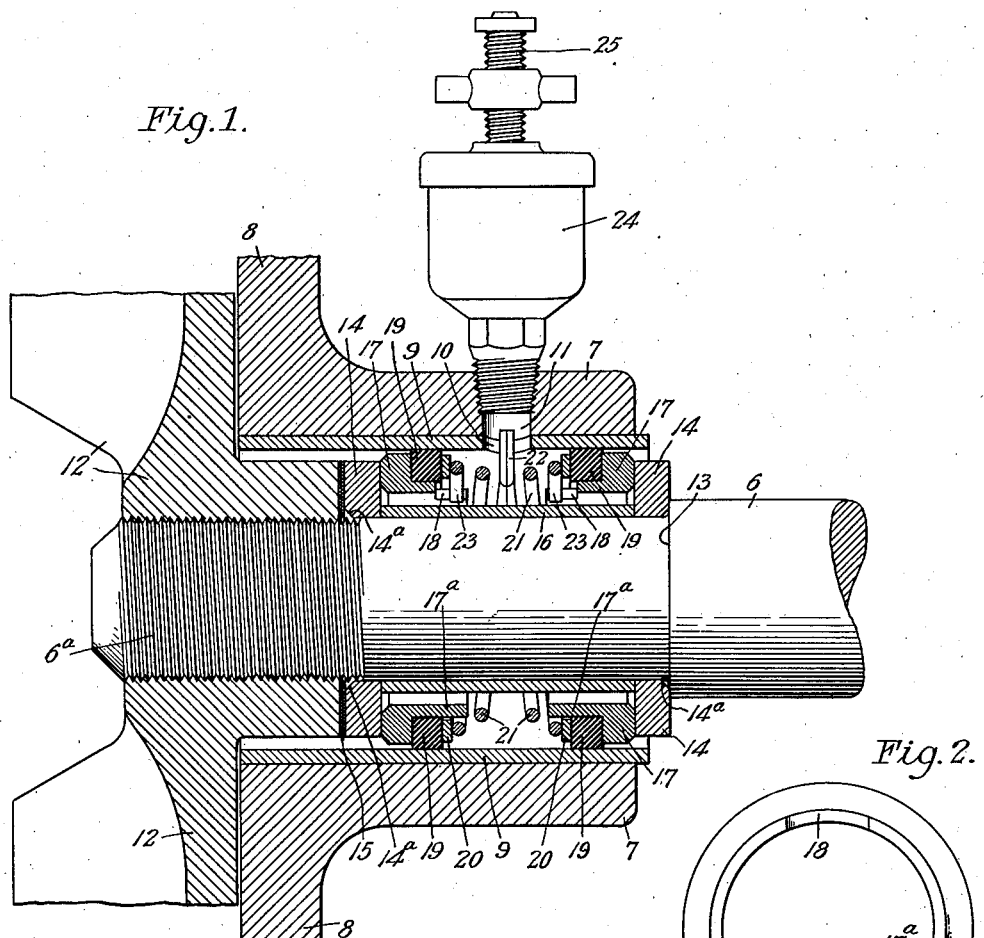
Fig. 1 is a vertical side section view of the improved sealing means on one end of a shaft shown broken away, the main journaling support therefor being omitted.
Figure 2:
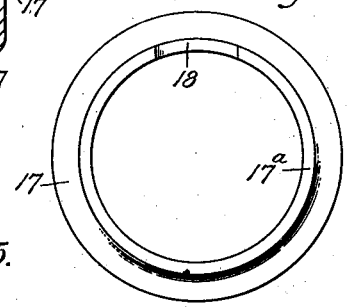
Fig. 2 is a front end view of one of the component elements.

In the illustrative embodiment, the end of a rotary shaft 6 extends through a bearing-like annulus or collar member 7 in this instance forming part of the impeller casing 8 of a liquid pump. This annulus, constituting a housing for the sealing means, is fitted with a cylindrical liner or bushing 9, preferably of bronze, which may if so desired and in certain cases perhaps advantageously would have its inner surface serrated either longitudinally or circumferentially rather than formed perfectly smooth as represented in this case. A hole or recess 10 in said liner registers with a like hole or recess 11 in the annulus, these constituting and being the same in the present instance as the usual through-passage ducts for the introduction of lubricant as will later be explained further.

On its extended end at the inner side of the annulus or inside the casing, said shaft carries a rotary member 12 in this instance comprising the impeller wheel of the pump, which is shown to be mounted by threaded engagement over the threaded end 6a of the shaft, preferably in direction opposite to that of rotation so as to be tightened in place with operation. Said rotor member accordingly provides a removable abutment on the shaft at the inner side or end of the annulus. A fixed abutment at the outer side or end of the annulus is provided by a shoulder 13 formed as by an enlargement of the shaft body. Thus a substantial part of the shaft encircled by the annulus is confined between opposed abutments or shoulder surfaces.

Against these opposed abutments on the shaft a pair of bearing rings 14 are pressed one to each, these being of plain flat type except that they are desirably beveled as indicated by 14a at the edge fitting into the angle between said abutments and the shaft. The ring pressed against the rotor member or part thereof will also advantageously have spacing washers 15 interposed between them. Between the two rings themselves a spacer sleeve 16 is fitted close around the shaft, this latter serving to hold and partially to press said rings in place against their respective abutments. The order of assembly of these parts is of course inward—or outward with respect to the shaft end—from the shoulder 13, the aforementioned rotor member being applied lastly or only after the other named parts have first been placed in position. This applies also to the additional parts of the seal hereinafter described which are located between the two bearing rings, the order of assembly being such as to include them properly in place.

It will be apparent that when said bearing rings 14, the interposed spacer sleeve 16 and the rotor member 12 are secured in place, with said rotor member screwed tight upon the shaft so as to force them into firm bind against each other, they will together or mutually rotate with the shaft, all as one unit.

Between the spaced bearing rings 14 and bearing against the inward faces thereof is an opposed pair of wear rings 17 loosely encircling the spacing sleeve. These last-named rings, composed preferably of bronze, are substantially rectangular in cross-section, presenting conformatively flat side surfaces to the aforesaid bearing rings and paralleling flat peripheral surfaces toward but spaced from the liner of the annulus, and are formed with circumferentially recessed or reduced peripheries providing laterally extended flange portions 17a on their inward sides. Each has a notch 18 cut or otherwise formed therein for a purpose which will later be made apparent. Engaged over said flange or reduced body portions 17a of the rings are peripherally encircling packing rings 19 made of rubber or other suitable flexible material. These latter rings are somewhat larger in outer diameter than the former or supporting rings and so extend therebeyond circumferentially, thereby presenting flat faces in pressure contact with the inner surface of the annulus liner 9 and at the same time centering the said former or supporting rings within said annulus. They are thrust sidewise close against the enlarged or head portions of the supporting wear rings and are engaged at the opposite sides by a pair of backing or washer rings 20 fitted thereagainst over said flange portions of the wear rings.

Figure 4:
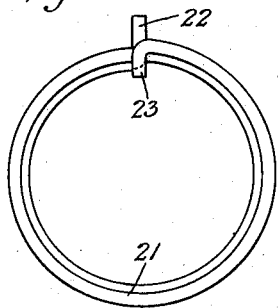
Fig. 4 is an end view of another part of the sealing means.
Figure 5:
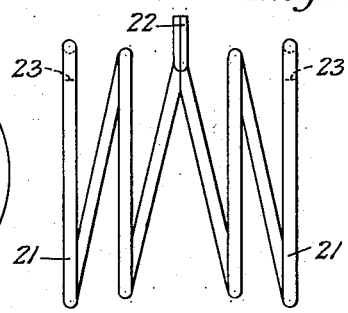
Fig. 5 is a side view of the last mentioned part.
Figure 3:
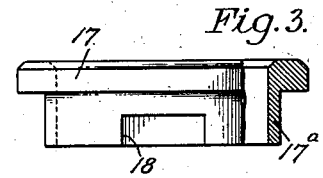
Fig. 3 is a side or edge view of said element, shown partly broken away and in section.

Between said wear rings and the packing rings 19 carried thereby a spring 21 encircling the shaft presses endwise in opposite directions against the backing or washer rings 20, so as to simultaneously compress and distend said packing rings outwardly or radially and to thrust or press said wear rings against their bearing surfaces. Said spring comprises an expanding coil type member of special form, in this instance constituting two half-spring portions of frusto-conical shape joined together at their smaller frusto ends thereby producing a full spring tapering or decreasing in girth from each end inwardly toward the middle (see Fig. 5). At the middle or narrowest girth point, formed as by laterally bending the reduced ends of said united portions together, the spring is provided with an outward radial projection 22 extending somewhat beyond its body lines (see Fig. 4). At each end it is provided, as by extremital bending, with inward radial projections 23 in the same or substantially the same diametrical plane with said outward projection. This special spring is fitted between the stated ring members with its said outward projection 22 extending into the co-registering holes 10 and 11 of the annulus and with its inward projections 23 engaging respectively in the aforementioned notches 18 of the wear rings 17, so as thereby to be held stationary or locked against turning and to in turn hold or lock said wear rings and their associated elements likewise stationary against turning. Thus, the spring serves the dual function of oppositely or outwardly pressing the wear rings with their carried packing rings tightly against their opposing surfaces and locking the said parts or elements against rotation with the rotary parts of the assembly.

It will be apparent that when said spring is expanded free of compression, it will draw its outward projection 22 inward and conversely when compressed will project said projection further outward. Accordingly, it is easily applicable to and from place in the assembly of the parts or seal. When inserted over the shaft and pushed into place, with a possible momentary distortion, its said projection simply snaps into the engaging recess and then moves further thereinto as the spring is compressed between the wear rings. When removed in dismantling of the seal, it is necessary simply to press said projection inwardly through the co-registering recesses 10 and 11 to disengage it therefrom, whereupon the spring can be withdrawn easily over the shaft end. This capability is afforded by the special and particular form of the spring with a tapering from opposite ends inwardly toward the middle and with said projection located upon the middle point or line of the same. This of course would not be possible if the spring were of ordinary helical or cylindrical form.

In the described assembly and relation the several parts together provide an effective seal preventing the leak of grease or fluid from or through the annulus around the shaft. The action of the spring of course is such as to laterally press the packing rings 19 in a squeezed distention radially pressing tight against the inner surface of the annulus liner 9 and therethrough at the same time to axially press and hold the wear rings 17 stationary against their bearing surfaces so that said packing rings are the more firmly pressed into place without the possibility of turning, even after they have aged or become somewhat worn so as to lose a certain amount of their individual friction bind against the surface to which they are pressed. Actually there is very little chance of their becoming worn under these conditions, because they are not subjected to rotational influences through their carrying wear rings working against the bearing rings. In consequence, they become almost adhesively pressed into contact with the annulus liner and there is no chance of leakage past the same. This firm bind against the annulus liner might in some cases be augmented by serrating said liner either longitudinally or circumferentially as hereinbefore mentioned, although ordinarily it will be sufficient and probably preferred to make the liner surface perfectly smooth as herein shown. The organization and assembly of the parts is exceedingly simple, altogether durable and quite inexpensive. From the practical standpoint it fulfills all that can be desired and meets all necessary requirements in a mechanical appliance of the kind where it is desired to effect a positive seal around a rotating shaft.

The several parts, and particularly the wear and bearing rings 17 and 14 respectively, are lubricated expeditiously by a spring-loaded grease cup 24 applied in this instance into the through-passage formed by the aforementioned co-registering duct holes 10 and 11; that is, the hole or recess 11 in the annulus is simply extended all the way therethrough to receive said grease cup by threaded engagement thereinto. This grease cup which is filled with a suitable lubricant, has an internal plunger (not shown) carried on a threaded stem 25 which is forced downward so as to push the lubricant forcibly through the through-way passage 10—11 into the space between and around the wear rings. The force of the feed is such as to keep said space adequately filled to lubricate the parts as necessary without leaking therebetween to the outside. Thus, a sufficient amount of lubricant will enter between the wear and bearing rings without escaping to the outside. A positive and plentiful lubrication is accordingly provided to reduce friction and possible heating of the parts and to maintain the full efficiency of the seal and said lubricant will serve to augment the security of the seal by filling the spaces between the parts and repelling any tendency to fluid passage therethrough.

It will be understood that the rotatable shaft is not intended to be supported in or by the described structure but that said shaft is expected to have separate support or journaling in associated bearings not shown. It will also be understood that the shaft need not necessarily be a rotary shaft and that the invention may be applied as well to a stationary shaft for the same purpose should it be so desired.

The described sealing means may of course be embodied in various constructions and various changes may be made in the form, arrangement and relation of the respective parts, according to preference or particular requirements in different machines or operating structures, without exceeding the scope of the invention. Therefore, it will be understood that the appended claims are not intended to limit the invention to the specific construction or form, arrangement and organization of the parts as herein illustrated and particularly set forth, nor to otherwise impose limitations upon said invention beyond what said claims themselves in specific terms define.

Having thus described my invention, what I claim as new and desire to secure by Letters Patent of the United States is:

1. In means for sealing a shaft against leakage of lubricant or fluid in its extension through a casing, including in combination with the shaft and casing oppositely pressed seal or packing rings around the shaft bearing radially against a surrounding surface of the casing and a spring around the shaft pressing said rings to place, the improvement which consists in the fact that said spring is formed with an axial tapering inwardly from both ends toward the middle and at the middle is provided with a radial projection extending into a recess in said surface of the casing surrounding the shaft.

2. In means for sealing a rotable shaft against leakage of lubricant or fluid therearound in its extension through the wall of a casing, including in combination with the shaft and casing oppositely pressed seal or packing rings around the shaft bearing radially against a surrounding surface of the casing, elements also around the shaft supporting said seal rings and a spring encircling the shaft pressing said pressed rings on the supporting elements into place against said surrounding surface, the improvement which consists in the fact that said spring is formed with an axial tapering inwardly from both ends to the middle and at the middle is provided with an outward radial projection extending into a recess in said surface of the casing surrounding the shaft while at opposite ends it is provided with inward radial projections engaging with said supporting elements of the rings, whereby the said spring and said rings with their supporting elements are locked against rotation or turning with the shaft.

3. In means for sealing a shaft against leakage in its extension through a casing, including in combination with the shaft and casing oppositely pressed seal or packing rings supported around the shaft in bearing against a surrounding surface of the casing, the improvement which consists in a coil type spring encircling the shaft and pressing the said pressed rings on their supports into place, the said spring being formed with an axial tapering inwardly from both ends to the middle and at the middle being provided with a radial projection extending into a recess formed in said surface of the casing surrounding the shaft, and at opposite ends being provided with radial projections engaging with the said supports of the rings, whereby said spring and said rings pressed thereby are effectively locked against rotation or turning with the shaft.

4. In sealing means for a rotatable shaft extending through a casing, which means includes seal or packing rings around the shaft pressed oppositely by a spring around the shaft into tight pressure contact with a surface of the casing surrounding the same, the improvement which consists in a spring of coil or helical form tapering inwardly from opposite ends to the middle, the said spring having an outward radial projection from its middle extending into a recess formed in the surrounding surface of the casing and having inward radial projections in a plane with said outward projection engaging into notches formed in said rings or their supporting members so as to lock and in turn lock the rings against rotation with the shaft.

5. A sealing means for a shaft extending through a casing, comprising, in combination with the shaft and casing, a liner for that part of the casing through which the shaft extends, abutments on the shaft at opposite ends of the liner, a spaced pair of bearing rings around the shaft pressed oppositely against said abutments, a pair of wear rings around the shaft pressed oppositely against said bearing rings, seal or packing rings carried by said wear rings in tight pressure contact circumferentially with the inner surface of said liner, and a spring around the shaft between said wear rings pressing endwise in opposite directions against said seal rings, the said spring comprising a coil or helical member tapering inwardly from opposite ends to the middle having a radial projection from its middle extending into a recess formed in the liner and projections at opposite ends engaging into recesses formed in the wear rings, whereby the spring is locked and in turn locks said wear rings with the seal rings against rotation or turn movement with the shaft.

JAMES C. GORMAN.